No. 726,707. PATENTED APR. 28, 1903.
T. J. LAVENDER.
CHOPPING KNIFE.
APPLICATION FILED NOV. 15, 1902.

NO MODEL.

Witnesses
F. A. Darrow
M. A. Schmidt

Inventor
Thomas J. Lavender
by Milo B. Stevens
Attorney

UNITED STATES PATENT OFFICE.

THOMAS J. LAVENDER, OF GRAND RAPIDS, MICHIGAN.

CHOPPING-KNIFE.

SPECIFICATION forming part of Letters Patent No. 726,707, dated April 28, 1903.

Application filed November 15, 1902. Serial No. 131,525. (No model.)

*To all whom it may concern:*

Be it known that I, THOMAS J. LAVENDER, a citizen of the United States, residing at Grand Rapids, in the county of Kent and State of Michigan, have invented certain new and useful Improvements in Chopping-Knives; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in chopping-knives for cutting meats and vegetables into fine particles, and has for its object an implement of this kind which may also be used for cutting or forming dough into the required shape for biscuits, cakes, &c.

With this and other objects in view the invention consists in a novel arrangement and combination of parts hereinafter described and claimed.

Figures 1, 2:
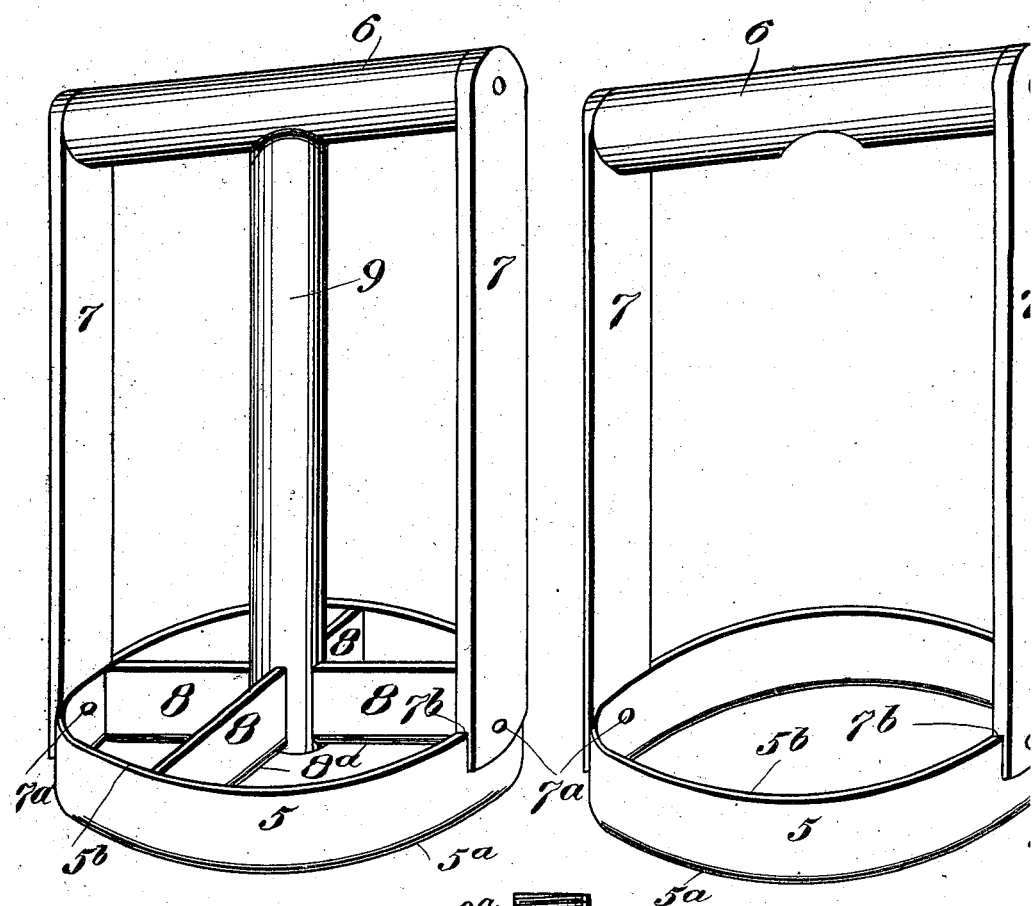
Figure 3:
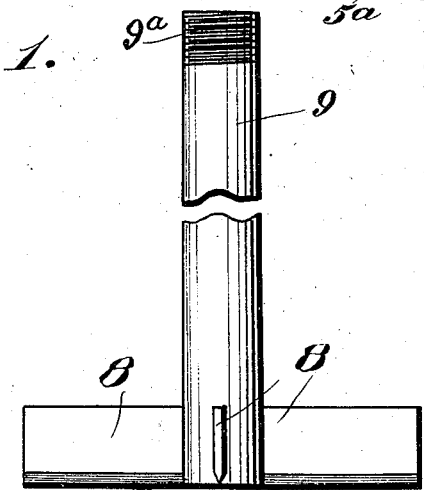

In the accompanying drawings, Figure 1 is a perspective view of my invention. Fig. 2 is a like view showing it arranged as a dough-cutter. Fig. 3 is a front elevation of the transverse knives detached.

Referring specifically to the drawings, 5 indicates an annular knife having a sharpened lower edge $5^a$ and a handle 6, secured to the knife by two side pieces 7, which are riveted thereto, as at $7^a$, and are also provided with shoulders $7^b$, resting on the upper edge $5^b$ of the knife with a view to greater strength.

Transverse knives 8 extend diametrically within the annular knife and are also provided with a sharpened lower edge $8^a$, occupying the same horizontal plane as the cutting edges $5^a$. The knives 8 are secured to the lower end of a shank 9, the upper end of which is threaded, as at $9^a$, and screws into a threaded socket in the handle 6. The knives 8 fit loosely within the annular knife and are readily removed by unscrewing the shank 9 from the handle 6. This is very handy and permits the knife 5 to be used alone as a dough-cutter for forming biscuits, cakes, &c.

As will be seen, my device is very simple in construction and inexpensive to manufacture.

Having thus described my invention, what is claimed as new, and desired to be secured by Letters Patent, is—

The combination with an annular knife and the handle thereof having a threaded socket, of a shank adapted to be screwed to said socket, and transverse knives on the shank within said annular knife, substantially as described.

In testimony whereof I affix my signature in presence of two witnesses.

THOMAS J. LAVENDER.

Witnesses:
S. S. MILES,
JENNIE MILES.